July 20, 1965 P. HØHNE 3,195,241
AIR LOCK ARRANGEMENT AND METHOD FOR TRANSFERRING
A POWDER FROM A CHAMBER MAINTAINING A ROTARY
FLOW OF GAS, TO PNEUMATIC CONVEYOR PLANT
Filed May 8, 1962
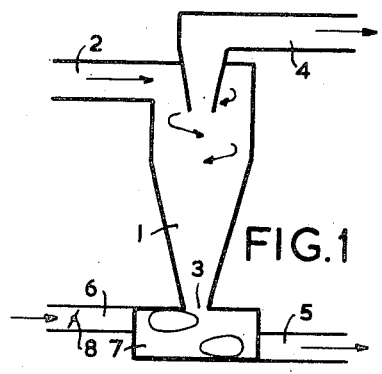
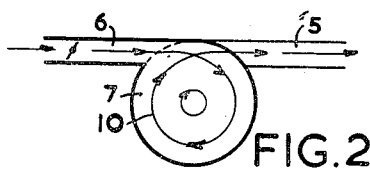
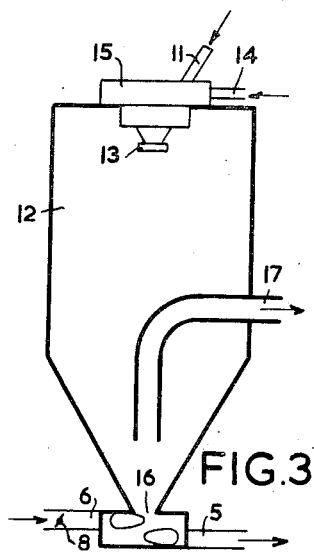
INVENTOR.
Per Høhne
BY
Stevens Davis, Miller & Mosher
Attorneys United States Patent Office 3,195,241
Patented July 20, 1965

3,195,241
AIR LOCK ARRANGEMENT AND METHOD FOR TRANSFERRING A POWDER FROM A CHAMBER MAINTAINING A ROTARY FLOW OF GAS, TO PNEUMATIC CONVEYOR PLANT
Per Høhne, Horsholm, Denmark, assignor to A/S Niro Atomizer, Soborg, Denmark
Filed May 8, 1962, Ser. No. 193,118
Claims priority, application Denmark, May 18, 1961, 2,056/61
5 Claims. (Cl. 34—10)

This invention relates to an air lock arrangement for transferring a powder from a chamber maintaining a rotaty flow of gas and comprising a powder outlet and a gas outlet for the separate discharge of powder and gas, such as a cyclone or a reaction or drying chamber, to a pneumatic conveyor plant, and means for preventing the gas separated from the powder in said chamber from mixing with the gas used in the conveyor plant.

In treating or producing powders in apparatuses of this type, where the treatment is effected in a flow of gas wherein the powder material is present in a more or less floating state, the finished powder is to be separated from the treatment gas which, for example, may be effected in a cyclone having the form of a cylindrical chamber where the powder-laden gas is supplied tangentially, preferably at the top, and comprising a powder outlet at the bottom and a gas outlet at the top through a pipe extending axially a short distance downwards in the chamber with its mouth facing the bottom.

The powder outlet is often connected with a pneumatic conveyor plant for removing the powder for storage, packing, or further processing purposes.

In the connection between the cyclone and the conveyor plant, the treatment gas and the gas used for the conveyance will have a tendency to mix, which is undesired as two different gases are concerned.

The conveyor plant usually employs atmospheric air, except for such cases where the powder is detrimentally influenced by atmospheric air, whereas the treatment gas may be a different gas dependent on the nature of the treatment. Often, however, the treatment gas can also be atmospheric air, for example, where the production of powders by atomization-drying is concerned, but even in such case there can be such difference between the treatment gas and the carrier gas, for example, with respect to moisture contents or temperature that a mixing is undesired. Even in cases where there is no such difference, or where such difference is of no consequence, there may nevertheless be a difference which makes mixing undesirable, i.e. if the treatment gas contains very fine floating powder particles which it is not desired to transfer to the conveyor plant but which, for example, are to be exposed to a further separation process or, if so desired, returned to the treatment zone.

In atomization drying where a liquid which contains the starting material of the desired powder in a dissolved or dispersed state, is atomized in a drying chamber where the liquid particles are exposed to the influence of a turbulent drying gas where, at the bottom of the drying chamber, provision is made of a powder outlet from which the finished powder may be transferred to a pneumatic conveyor plant, and in connection with other types of reaction in reaction chambers of similar design, quite the same problems are involved as those of a cyclone since in these cases a separation is to be effected in quite the same manner between a powder and a gas flow wherein said powder is present in a more or less floating state.

It is known to connect the chamber with the conveyor plant via a rotary valve or air lock, and by such arrangement it is possible per se to obtain a satisfactory separation between the gas circulating in the chamber and the carrier gas but, as far as many products are concerned, certain difficulties will arise because the powder particles may be sticky to some extent, for example, owing to a certain content of moisture or to the ambient temperature, said stickynes being then removed in the conveyor plant by an after-drying or cooling process by means of the carrier gas, which moreover may be one of the reasons why it is undesirable that the carrier gas is mixed with the treatment gas which in such case would have the very properties which counter-act an after-treatment aimed at. In such cases there will be a tendency for the powder to hang in the air lock and it will then cause obstructions therein with consequential operational stops, and on the other hand obstructions may also occur in such a rotary valve even if the powder is not sticky.

One might imagine avoiding these drawbacks by having a fully open connection between said chamber and the conveyor plant and then try to equalize the pressures so as to avoid any tendency of the carrier gas to make its way into the chamber, or of the gase of the chamber to make its way into the conveyor plant, but in the prior art plants it is not possible to attain such equalization of the pressures to an extent sufficient for avoiding mixing of the gases. This is owing to the fact that the pressure varies at the different points of the powder outlet of the chamber. Thus, there is a very low pressure in its centre whereas near its circumference the pressure is of a considerable size. The pressure differences may by way of example lie between 300 and 600 mm. water column. This has the effect that if the pressure in the conveyor plant is adjusted in conformity with the pressure at the circumference of the outlet, an axial flow will take place from the conveyor plant upwards into the chamber and, consequently, the result is an undesired mixing of the two gases and, moreover, a simultaneous returning of powder from the conveyor plant to the chamber. If the pressure in the conveyor plant is adjusted in conformity with the pressure in the centre of the outlet, the result will be an oppositely directed flow of gas from the chamber to the conveyor plant at the circumference of the outlet, which as said above is likewise undesired. If, eventually, the pressure is adjusted to a mean value, an upwards directed flow is attained in the central region and a downwards directed flow at the circumference and, consequently, likewise an undesired mixing.

The invention has for its object to provide an air lock arrangement of the type referred to above, which contains no movable mechanical parts with the risk of obstructions and operational stops, but which in a particularly effective manner prevents said undesired mixing.

According to the invention this is attained by the said means for preventing a mixing of the two gases consisting of a vortex chamber disposed co-axially underneath and in unobstructed connection with the powder outlet in the conveyor plant with tangential inlet and outlet for the carrier gas arranged at mutually different levels.

By this arrangement, it is true, the result will be that the gas vortex in the chamber makes its way through the powder outlet right down into the conveyor plant, namely, into said vortex chamber and right down to the bottom of said vortex chamber, which as said above forms part of the conveyor plant, but by this very feature the essential advantage is attained that the bordering surface between the two gases, that is the external surface of the gas vortex occurring in the vortex chamber and the internal surface of the carrier gas vortex, will be a surface of revolution having the axis of the chamber as its axis, and in such surface of a vortex there will by and large prevail the same pressure in any point, and it is therefore possible to obtain an equilibrium between the two gas vortices while the powder particles unobstructed by any mechanical partition are transferred by the centrifugal force from the innermost vortice to the outermost one and, consequently, from the chamber gas to the carrier gas.

At the same time the advantage is attained that the powder is maintained in lively motion and has nowhere any tendency to deposit which, as will appear from the above, is of particular importance in the case of powders of a sticky nature.

Mixing will, of course, as is the case when using a rotary valve, or other form of a mechanical air lock, occur as a consequence of diffusion, but such mixing is of no essence in contradistinction to a mixing called forth by gas currents owing to pressure differences.

The invention will be explained in detail with reference to the accompanying diagrammatical drawing which shows two different apparatuses comprising the air lock arrangement according to the invention, and where FIG. 1 diagrammatically shows a cyclone comprising the air lock arrangement according to the invention, FIG. 2 is a bottom-plan view of the air lock arrangement shown in FIG. 1, and FIG. 3 is an apparatus for the production or treatment of powders by the atomization method, provided with the air lock arrangement according to the invention.

The cyclone shown in FIG. 1 comprises in the conventional manner a chamber 1 to which there is tangential supply of gas at top through an inlet 2 whereby there will occur in the chamber 1 a vigorously criculating flow of gas in such manner that the powder material contained in the gas is separated off and may be removed through a powder outlet 3 at the bottom of the chamber while the gas is exhausted through a gas outlet 4 axially extending down into the chamber with its mouth at a lower level than the gas inlet 2.

The powder discharged through the outlet 3 is to be passed on through a line 5 of a pneumatic conveyor plant fed through a carrier gas inlet 6.

In order to prevent, to the greatest possible extent, any mixing from taking place between the gas admitted to the chamber 1 through the inlet 2 and the carrier gas, there is according to the invention under the powder outlet 3 and co-axially therewith disposed a vortex chamber to which the carrier gas inlet 6 and the conveyor line 5 both are tangentially connected, such as will appear from FIG. 2, and at mutually different levels.

Between the chamber 1 and the vortex chamber 7 there is an open connection which will cause the gas vortex in the chamber 1 to extend down into the vortex chamber 7 where it is co-axially surrounded by a vortex of the carrier gas.

Experiments have shown that by adjusting the inlet pressure and the velocity of the carrier gas which may be effected by means of an adjustable throttle member, diagrammatically shown at 8, it is possible to obtain such sharp definition between the two gas vortices, of which the one coming from the chamber 1 is in FIG. 2 designated by 9 and the other one by 10, that practically no mixing between the gases takes place.

As a consequence of the effect of the centrifugal force, the powder particules will in the vortex chamber be precipitated from the vortex 9 out into the vortex 10 and thereupon be transferred to the carrier gas and carried along therewith through the pipe 5.

While in the case of the known arrangements for preventing the mixing of the two gases, there will always as a consequence of the application of these arrangements occur a reduction of the effectivity of the cyclone, it proves that this is not the case when using the air lock arrangement according to the invention, in as much as in many cases even a certain improvement of the effectivity of the cyclone is attained.

FIG. 3 shows diagrammatically an apparatus for treating or producing powders, where the initial material is either dissolved or dispersed in a liquid in a more or less moist state, introduced through the inlet 11 to an atomizer 13, shown purely diagrammatically, disposed in a reaction or drying chamber 12, which atomizer is a rotary atomizer or a nozzle atomizer or a plurality of such, and need not as shown to be axially disposed in the chamber but may be located at any appropriate place such as it is known per se.

The atomized material is in chamber 12 subjected to a treatment which may be a drying or chemical process, axially supplied through a gas inlet 14 to a ring chamber 15 located in the ceiling of the chamber 12, from which ring chamber the gas is rotationally directed into the chamber 12 such as it is commonly known. Any other form of gas supply by which the desired circulating flow is obtained, may find application.

In the bottom of the chamber 12 there is provided a powder outlet 16 and further there is a gas outlet pipe 17 having an axially located downwardly facing mouth.

When the powder is to be transmitted pneumatically, quite the same task as described in connection with the cyclone aforesaid is present here and this task can, therefore, according to the invention be solved in quite the same manner, namely, as indicated by placing the ring chamber 7 co-axially under the powder outlet 16.

I claim:

1. A device for transferring a powdered medium from a gaseous medium to a carrier gas, comprising chamber means, inlet means for supplying said chamber means with said gaseous medium containing said powdered medium in a rotating manner, vortex chamber means disposed adjacent the bottom of said chamber means in unobstructed connection therewith over the full cross-sectional area of the vortex chamber means, an inlet member and an outlet member for supplying carrier gas to the vortex chamber means tangentially disposed axially spaced with respect to each other, means being provided for the adjustment of the relative rotational velocities and pressure of the gaseous medium and the carrier gas.

2. A device according to claim 1, wherein said inlet means includes an atomizer means and supply pipe for supplying said powdered medium to said atomizer means in a state dispersed in a liquid, and further inlet means for supplying a gaseous treating medium into said chamber means, said atomizer means being disposed so as to atomize said liquid in which said powdered medium is dispersed, into said gaseous treating medium in said chamber means.

3. A device for transferring a powdered medium from a gaseous medium to a carrier gas comprising chamber means having a cylindrical upper section and a conical lower section, means for introducing said gaseous medium containing said powdered medium into the said cylindrical section into a vortex flow, outlet means so disposed in said chamber means as to draw off said gaseous medium after said powder has been separated therefrom, vortex chamber means coaxially disposed adjacent the lower end conical section in unobstructed connection therewith over the full cross-sectional area of said lower end of said conical section, said vortex chamber means having a diameter greater than the lower end of said conical section, an inlet member for supplying carrier gas to said vortex chamber, an outlet member for removing said carrier gas containing said powder from said vortex chamber, said inlet and outlet members being tangentially disposed on the same side of said vortex chamber means and axially spaced along said side with respect to each other and means for the adjustment of the rotational velocity and pressure of the carrier gas relative to the velocity and pressure of said gaseous medium so as to maintain a non-mixing vortex flow of each in said vortex chamber means, said carrier gas vortex flow circumscribing said gaseous medium vortex flow.

4. A device according to claim 1, wherein said inlet means includes an atomizer means and supply pipe for supplying said powdered medium to said atomizer means in a state dispersed in a liquid, and further inlet means for supplying a gaseous treating medium into said chamber means in a vortex flow, said atomizer means being disposed so as to atomize said liquid in which said powdered medium is dispersed, into said gaseous treating medium flow in said chamber means.

5. A method for transferring finely pulverized material from a treatment chamber to a pneumatic conveyor plant utilizing gaseous mediums comprising the steps of supplying said chamber with said material as a powder suspended in a first gaseous medium having a vortex flow in said chamber, establishing a vortex flow of a second gaseous medium as a carrier gas coaxial with and below the vortex flow of said first medium, introducing said first vortex flow within the center of said second vortex, maintaining the two vortex flows separate from each other by controlling the inlet pressure and velocity of said carrier gas forming said second vortex to establish a pressure equilibrium between the two vortex flows, transferring the powder from the first vortex by centrifugal force to the second vortex and subsequently transporting said transferred powder in said second vortex to said plant by a stream of said carrier gas from said second vortex.

References Cited by the Examiner

UNITED STATES PATENTS

| 1,276,653 | 8/18 | Herbert | 302—46 |
| 2,314,159 | 3/43 | Peebles | 159—4 |
| 2,728,995 | 1/56 | Schaub | 34—57 |
| 2,799,095 | 7/57 | May | 34—57 |
| 2,869,677 | 1/59 | Yellott | 55—431 X |

WILLIAM F. O'DEA, *Acting Primary Examiner.*

NORMAN YUDKOFF, *Examiner.*